United States Patent [19]

Lundqvist

[11] 4,149,473

[45] Apr. 17, 1979

[54] SHELVING ASSEMBLY

[76] Inventor: Harald Lundqvist, En Quarroz, CH-1807 Blonay, Switzerland

[21] Appl. No.: 849,464

[22] Filed: Nov. 7, 1977

[30] Foreign Application Priority Data

Nov. 15, 1976 [SE] Sweden .............................. 7612744

[51] Int. Cl.² .......................... A47B 3/00; A47B 43/00
[52] U.S. Cl. .................................. 108/111; 108/106; 312/257 R; 312/263
[58] Field of Search .................... 312/264, 263, 257 B, 312/257 SM, 257 SK, 140, 257 R; 52/282; 108/111, 108, 106

[56] References Cited

U.S. PATENT DOCUMENTS

| | | | |
|---|---|---|---|
| 1,314,271 | 8/1919 | Kopp | 312/264 X |
| 1,818,404 | 8/1931 | Kaufman | 52/282 |
| 2,079,635 | 5/1937 | Sharp | 52/282 X |
| 2,667,401 | 1/1954 | Knuth | 312/253 |
| 3,207,322 | 9/1965 | Pedersen | 108/106 X |
| 3,429,631 | 2/1969 | Neyroud | 312/264 X |
| 3,452,501 | 7/1969 | Zimmer et al. | 52/282 X |
| 4,029,025 | 6/1977 | Lundquist | 108/108 |

FOREIGN PATENT DOCUMENTS

| | | | |
|---|---|---|---|
| 1311988 | 5/1962 | France | 52/282 |
| 722274 | 1/1955 | United Kingdom | 52/282 |

*Primary Examiner*—James T. McCall
*Attorney, Agent, or Firm*—Burns, Doane, Swecker & Mathis

[57] ABSTRACT

A shelving assembly comprises two side pieces, a back plate positioned between the side pieces, a plurality of adjustable shelves, and a plurality of edge strip members. The latter connect rear edge portions of the side pieces to vertical side edges of the back plate. Each edge strip member is securely attached to the back plate and is positioned along the side edges of the back plate. Each edge strip member includes a forwardly directed channel which slidingly engages around at least a part of an associated vertical rear edge of a side piece in a manner binding the side piece to the side edge of the back plate independently of separable fasteners.

4 Claims, 16 Drawing Figures

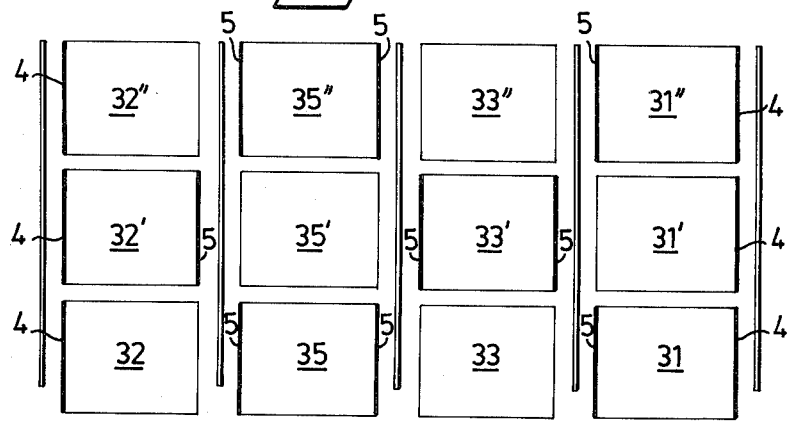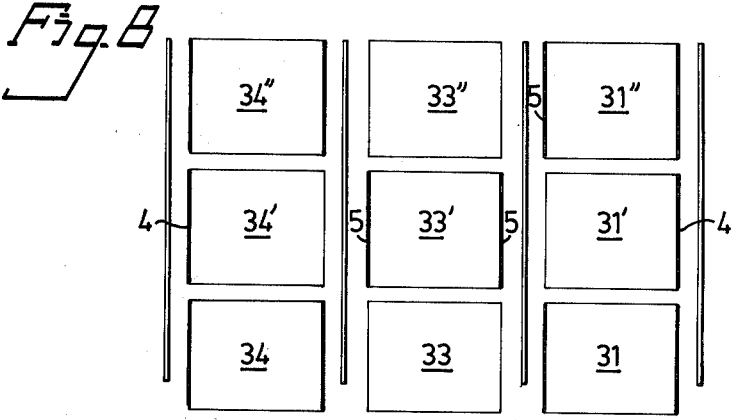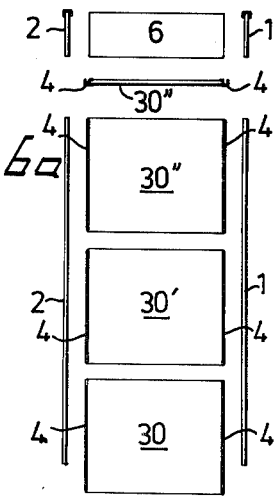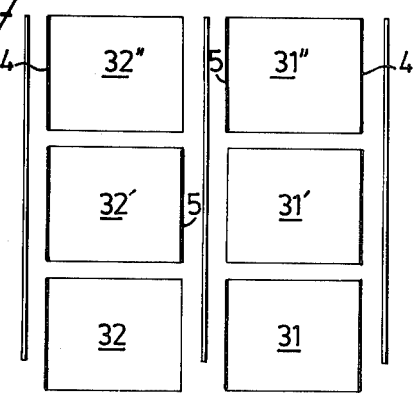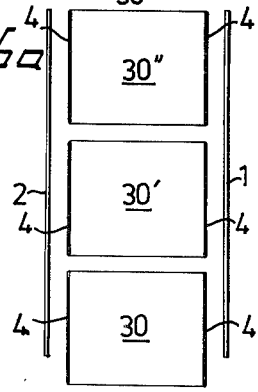

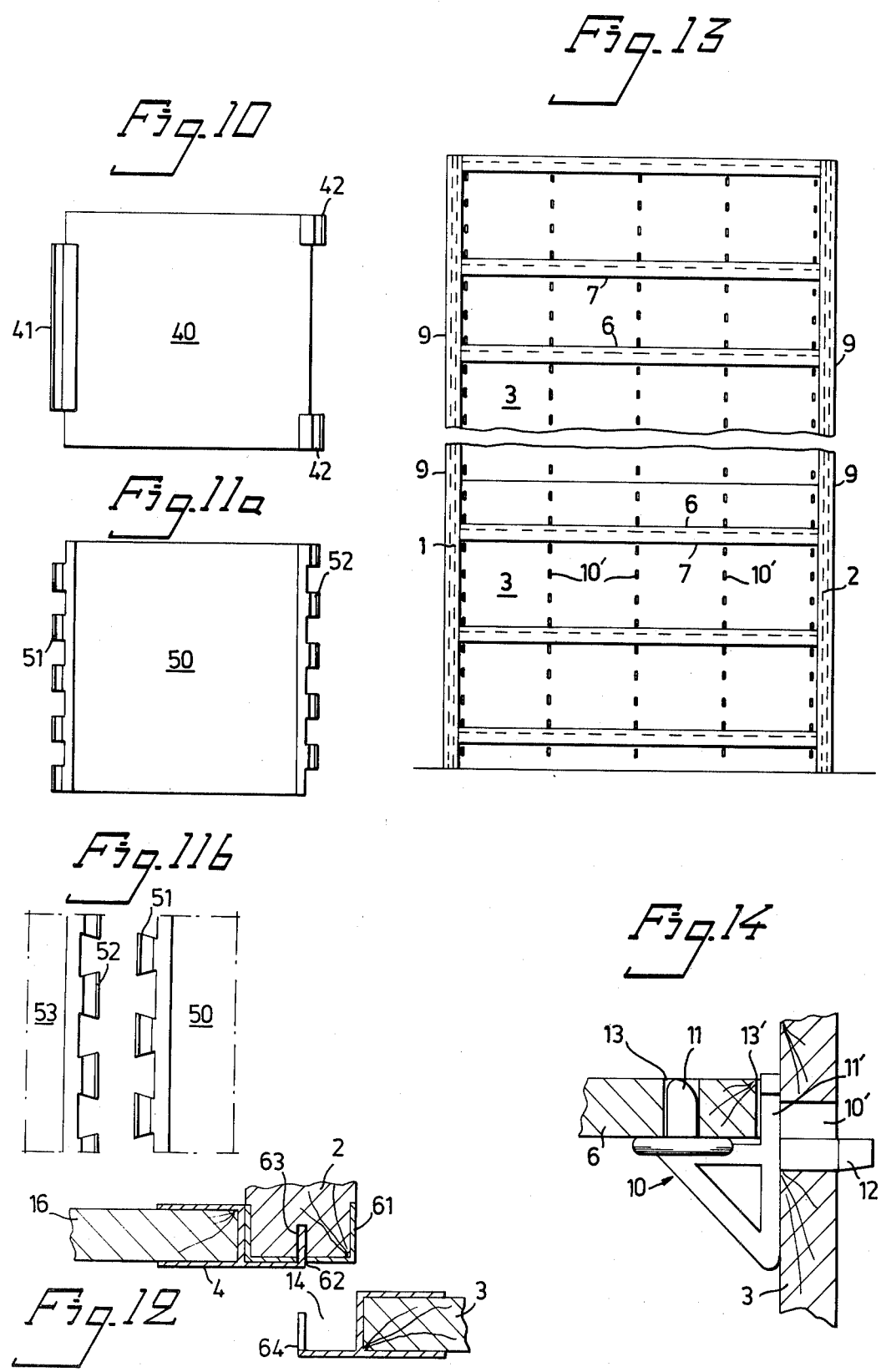

SHELVING ASSEMBLY

The present invention relates to a shelving assembly comprising two side-pieces, a back-plate and a plurality of removable shelves each of which comprises a thin panel whose leading edge ir reinforced by means of a reinforcing means in the form of a securely-clamped sheet-metal member whose height is substantially greater than the thickness of the shelf, each shelf being connected to the side-pieces at the ends of the sheet-metal member by hook-shaped support means which engage in apertures in the side-pieces, and in which shelving assembly means are provided for holding the back-plate pressed against the rear edges of the shelves to stiffen the back-plate by means of the shelves connected with the side-pieces, said back-plate being insufficiently rigid to support the rear edges of said shelves. In this way there is provided a light construction which can be erected without the use of tools and which has unusually good stability, even in the case of extremely large shelving assemblies.

The shelves of the shelving assembly preferably comprise thin panels of chipboard. The vertically extending side edges of the back-plate must be reliably connected to the rear edge portions of the side-pieces. It is desirable that this can be effected in a manner which enables the shelving assembly to be erected and dismantled without requiring the use of fittings of a kind which would greatly increase the cost of the shelving assembly. A further requirement is that when required it must be possible to erect one or more further shelving assemblies to one or both side-pieces of an erected shelving assembly.

Accordingly this invention consists in a shelving assembly comprising two side-pieces, a back plate and a plurality of movable shelves, wherein the vertically extending side edges of the back-plate are provided with edge strips having a forwardly-directed channel which engages around at least part of the rear edges of respective side-pieces in a manner such as to bind the rear edges of the side-pieces to the respective side edges of the back-plate.

So that the invention will be more readily understood and further features thereof made apparent, exemplary embodiments of the invention will now be described with reference to the accompanying schematic drawings, in which:

FIG. 1 is a sectional view in plan of part of an erected shelving assembly according to the invention in which, for the sake of clarity, the back-plate has been moved slightly away from the side-pieces, FIG. 2 is a rear view of the corners of two abutting back-plate sections of wo combined shelving assemblies with associated connecting strips, FIG. 3 is a cross sectional top plan view showing the assembly of the back-plates of two shelving assemblies connected to form a double shelving assembly and the rear edge of a side-piece common to both assemblies, FIG. 4 is a cross-sectional side view through a joint between two sections of a divided back-plate, FIG. 5 illustrates diagrammatically the positioning of vertically extending edge strips and horizontally extending jointing strips in the embodiment illustrated in FIGS. 1–3 in the erection of a double shelving assembly, FIG. 6a is an exploded, diagrammatic illustration of a single shelving assembly wherein the back plate comprises a plurality of vertically stacked sections, FIG. 6b is a plan view of the assembly as depicted in FIG. 6a, FIGS. 7–9 illustrate diagrammatically and in exploded format the positioning of edge strips in a shelving structure comprising respectively two, three and four assemblies intended to be coupled together, FIG. 10 is a front view of a back-plate having edge strips in accordance with a modification of the embodiment illustrated in FIGS. 1–3, FIG. 11a is a front view of another modification of the embodiment shown in FIGS. 1–3, FIG. 11b is a fragmentary view of a modified form of the edge strip shown in FIG. 11a situated next to a corresponding edge strip on an adjacent back plate section to which it is to be connected, FIG. 12 is a cross-sectional view similar to that shown in FIG. 3 and illustrates a modification of the edge strips and their engagement with the rear edges of the side-pieces, FIG. 13 is a front view of a shelving assembly, and FIG. 14 is a side view of a hook-shaped support means for fixing the rear edges of the shelves to the back-plate.

In FIGS. 1–4 there is shown a first embodiment of a shelving assembly according to the invention, comprising two side-pieces 1,2, a back-plate 3 whose side edges engage in rails or edge strips 4,5, a plurality of movable shelves 6, of which, for the sake of clarity, only a part of one shelf is shown in FIG. 1. The leading edge of each shelf 6 is provided with a reinforcing member 7 made of sheet-metal, the ends of which member are supported by means of hook-like devices 8, each of which engages, with a small clearance, in an associated aperture disposed in a sheet-metal reinforcing member 9, one such member 9 being securely mounted onto the vertical leading edge of each side-piece 1. The shelves 6 are supported by a supporting device 10 having a portion which engages in a respective hole 10' disposed in the back-plate 3, and, when necessary, also in the side-pieces 1, each of said devices 10 having a peg 11 which projects into a respective hole in an associated shelf. In this way, both the shelves 6, the side-pieces 1 and the back-plate 3 can be manufactured from thin panels, suitably of a non-metallic material, preferably chipboard, and still provide a shelving assembly of surprisingly good stability and high mechanical strength, this being due to the fact, among other things, that when assembled the different structural members of the shelving assembly form a lattice-like construction based primarily on the rigidity of the sheet-metal members, as described more precisely in the U.S. Pat. No. 4,029,025, in whcih patent all the said members, with the exception of the edge strips 4,5, are illustrated.

The illustrated side-piece 1 forms an outer end wall of the assembly. The edge strip 4 comrises a series of flanges and webs connecting said flanges arranged to form U-shaped channels 14 in respective ones of which the mutually adjacent, vertically extending edges of the back-plate 3 and side-pieces 1 are received, thereby to join the back-plate to said side-piece. In the illustrated embodiment, the side piece 2 is an intermediate wall and is joined to the back-plate 3 of the illustrated assembly and to a back-plate 16 of an adjacent shelving assembly by means of an edge strip 5 comprising a series of flanges and webs arranged in a manner to form channels 15 and 17 for accommodating the vertical rear edge of the side-piece 2 and the adjacent vertical side edge of the back-plate 16 respectively. The edge strips 4 and 5 are secured to respective back-plates by means of a suitable adhesive. It will be understood that when a single shelving assembly is to be erected, the side-piece 2 will form an outer, side-piece of the assembly and will be joined to the back-plate 3 by means of an edge strip 4.

The hook-like devices 8 and the support devices 10 are formed in such a manner that when the shelves 6 are supported by said devices the edge strips are unable to slide out of the rear edges of the side-pieces 1,2 owing to the locking effect afforded by said devices. The back-plate 16 of the adjacent shelving assembly, however, does require further locking means, to prevent it from sliding out of the channel 17. Such a locking means can be obtained by providing the side-piece 2 with a shelf supporting device 10, in the same manner as the side-piece 1 and/or by arranging such a device on the back-plate 16.

Such locking means, however, are not sufficient when a shelving assembly is to be subjected to very heavy loads or a great deal of stress. It may therefore be suitable to divide the edge strip into a plurality of sections and preferably also the back-plates into a plurality of sections, so that the edge-strip sections of two adjacent shelf assemblies are alternately connected to a common side-piece as illustrated in FIGS. 2–5, in which the back-plates comprise three sections 3,3',3" and 16,16',16". A further side-piece is referenced 21 and jointing strips of a known type having an H-shaped cross-section for joining together the three sections of the back-plates are designated 22.

The positioning of the edge strip and the jointing strip on the different sections of the back-plate are marked in FIG. 5 by heavy lines, from which figure it can be seen that the two shelving assemblies are locked to the common side-piece 2, which also applies, of course, when the divided edge strips are attached at the same position on an undivided back plate.

FIG. 6a illustrates diagrammatically the construction of a shelving assembly, seen from the rear, having a back plate divided into three sections 30,30',30", while FIG. 6b illustrates the shelving assembly in plan view.

FIGS. 7–9 illustrate, in a corresponding manner, the construction of shelving structures comprising two, three and four shelving assemblies respectively in side-by-side relationship, the back-plates of each assembly being devided into three sections identified by references 31,31',31"; 32,32',32"; 31,31',31"; 33,33',33"; 34,34',34"; and 31,31',31": 33,33',33"; 35,35',35"; 32,32',32" respectively.

Figure 1:
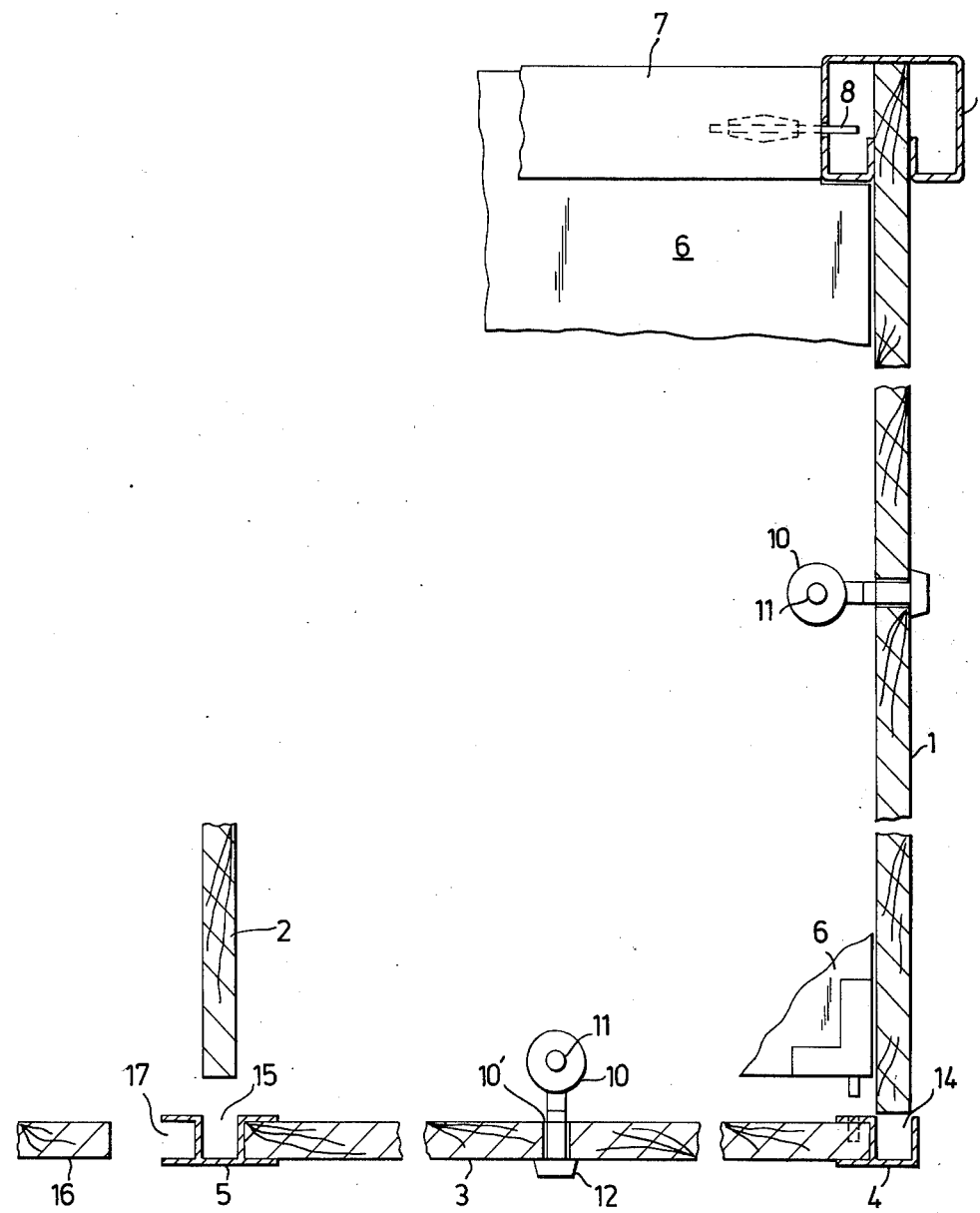
Figure 2:
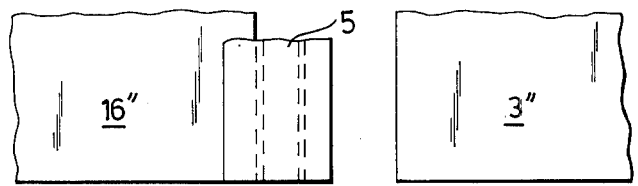
Figure 2:
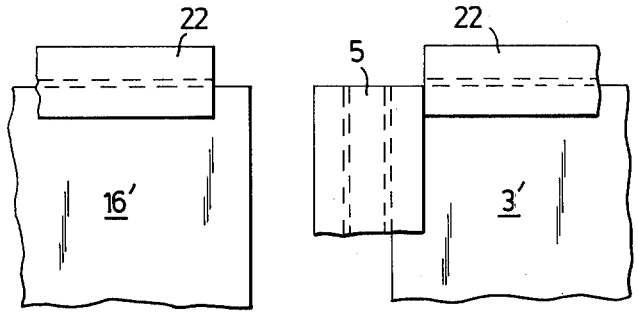
Figure 3:
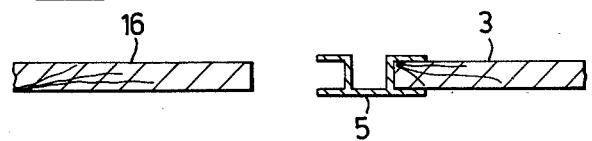
Figure 4:
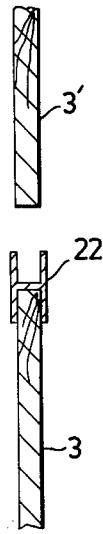
Figure 5:
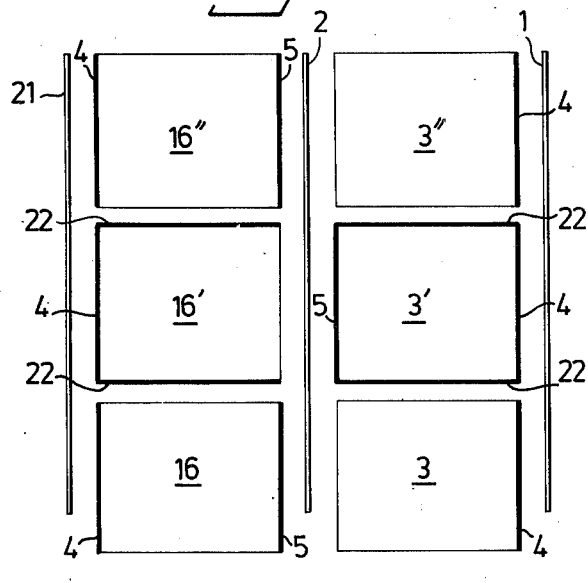

If it is desired to obtain identical back-plates in the different assemblies and in the different sections of each back-plate, edge strips 41,42 having the same cross-sectional shape as that referenced 4 in FIG. 1 can be arranged in the manner shown in FIG. 10. In this arrangement of the edge pieces, one long edge strip 41 is arranged on the centre portion of one edge of a back-plate or back-plate section 40 and a short edge strip 42 is arranged at each end of the edge opposite said one edge. In this way, the edge strips of the back-plates or back-plate sections of two assemblies can be joined to a common side-piece without blocking each other.

Alternatively, as shown in FIG. 11a, the edge strips, here referenced 51,52, may be disposed uniformly on the opposing vertically extending edges of a back-plate 50. The edges of the channels of the edge strips 51,52 may be inclined so that in respect of the back-plate 50 and a further back-plate 53 the edge strips may also be locked together by means of a dove-tail joint, as illustrated in FIG. 11b.

Another variant is illustrated in FIG. 12. In this embodiment, the channel 14 of the edge strip 4 is only half as wide as the channel shown in the FIG. 1 embodiment. Further, the side-pieces 1,2 are provided on their respective rear edges with a reinforcing member 61 made of sheet metal which surrounds the edges of side-pieces and in which there is provided a vertically extending slot 62. Arranged in the rear edges of the side-pieces in approximate register with the slot 62 is a further slot 63. The edge pieces are divided vertically in the manner previously described, so that the flanges 64 defining one wall of the channel can be inserted into the slots 62,63. The difference with the embodiment illustrated in FIG. 12 to the previously described embodiments resides in the fact that in the FIG. 12 embodiment the edge strips engage around only part of the side-pieces, the thickness of this part being approximately only half the thickness of the side-pieces of the previously described embodiment. The arrangement may also be such as to provide spaces between the different parts of the edge strip, corresponding interruptions being arranged in the slots 62,63 thereby to strengthen the rear edges of the side-pieces weakened by the slots.

FIG. 13 is a front view of an assembled shelving assembly, having the components illustrated to the right in FIG. 1 and being identified by the same reference numerals. The support means 10 shown in FIG. 1 is illustrated in side view in FIG. 14. The support member 10 is provided with a portion having a key-like bit 12 which is inserted into a hole 10' in the back plate 3. When passing the bit 12 through the hole 10', the support member 10 shall be held twisted through 90 degrees in a horizontal plane, and then turned to the illustrated position, in which the bit 12 holds the support member 10 firmly clamped, as illustrated in FIG. 1. The peg 11, which projects up into a hole 13 in the shelves 6, holds the rear edge of the shelf pressed against the back-plate 3, side ways movement of the shelf 6 in relation to the back-plate 3 being effectively prevented by an upwardly extending finger 11' of the support member 10, which finger is located in a corresponding recess 13' in the rear edge of the shelf 6.

I claim:
1. A shelving assembly comprising:
   first and second vertical side pieces, each side piece including a vertical rear edge portion,
   a plurality of adjustable horizontal shelves disposed between the side pieces,
   a first vertical back plate positioned between said side pieces and including first and second vertical side edges,
   first and second edge strip members connecting said rear edge portions of said first and second side pieces to said first and second side edges of said first back plate, respectively,
      each edge strip member being securely connected to said back plate and extending along the associated one of said side edges,
      each edge strip member including a forwardly open vertical channel which slidingly receives and extends around a first section of the rear edge portion of a respective one of said side pieces to connect such side piece to said first back plate independently of separate fasteners, a second vertical back plate adjacent to and in alignment with said first back plate, said second back plate including a vertical side edge facing said second side edge of said first back plate, a third edge strip member, separate from said first and second edge strip members, securely connected to said second back plate and extending along said side edge thereof, said third edge strip member including a forwardly open channel which slidingly receives and extends around a second section of the rear edge portion of said second side piece in spaced relation to said first section of said second side piece around which said second edge strip member extends, to connect said second side piece to said side edge of said second back plate independently of separate fasteners.

2. A shelving structure according to claim 1, wherein each back plate includes a plurality of vertically aligned sections, said back plate sections being joined together along common horizontal edges thereof by a jointing strip of H-shaped cross-section which defines upwardly and downwardly open channels which receive vertically adjacent ones of said back plate sections.

3. A shelving structure according to claim 1, wherein said channels of said second and third edge strip members are vertically offset from one another.

4. A shelving structure according to claim 1, wherein said rear edge portion of said second side piece includes a vertical U-bar; said rear edge and said U-bar forming a vertical slot along the vertical center line of such rear edge portion; said second and third edge strip members extending only partway around said rear edge portion and each including a portion extending into said slot.

* * * * *